(12) United States Patent
Barraclough et al.

(10) Patent No.: US 8,020,154 B2
(45) Date of Patent: Sep. 13, 2011

(54) PRECISE HANDLING OF EXCEPTIONS DURING PROGRAM CODE CONVERSION

(75) Inventors: Gavin Barraclough, Manchester (GB); Kit Man Wan, Oldham (GB); Abdul Rahman Hummaida, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 1671 days.

(21) Appl. No.: 11/272,882

(22) Filed: Nov. 14, 2005

(65) Prior Publication Data

US 2006/0253691 A1    Nov. 9, 2006

(30) Foreign Application Priority Data

Apr. 20, 2005   (GB) .................................. 0507943.9

(51) Int. Cl.
*G06F 9/44* (2006.01)
*G06F 9/45* (2006.01)
(52) U.S. Cl. ........ 717/131; 717/130; 717/143; 717/154; 714/2
(58) Field of Classification Search .................. None
See application file for complete search history.

(56) References Cited

U.S. PATENT DOCUMENTS

| | | | |
|---|---|---|---|
| 5,787,241 A | | 7/1998 | Henry et al. |
| 5,832,205 A | * | 11/1998 | Kelly et al. ..................... 714/53 |
| 6,161,219 A | * | 12/2000 | Ramkumar et al. .......... 717/130 |
| 6,327,668 B1 | * | 12/2001 | Williams .......................... 714/2 |
| 2002/0092002 A1 | | 7/2002 | Babaian et al. |
| 2004/0015627 A1 | | 1/2004 | Desoli et al. |
| 2005/0005265 A1 | | 1/2005 | Knowles |

FOREIGN PATENT DOCUMENTS

| | | |
|---|---|---|
| EP | 0 772 122 A2 | 5/1997 |
| EP | 0772122 A2 | 5/1997 |
| GB | 2 403 563 A | 1/2005 |
| WO | WO-00/22521 | 4/2000 |
| WO | WO-01/27752 A1 | 4/2001 |

OTHER PUBLICATIONS

PCT International Search Report issued for PCT/GB2006/001268, mailing date Jan. 23, 2007.

* cited by examiner

*Primary Examiner* — Chuck O Kendall
(74) *Attorney, Agent, or Firm* — Matthew B. Talpis; Gregory K Goshorn; Greg Goshorn, P.C.

(57) ABSTRACT

Precise exception handling relies on a precise subject state including an accurate program counter and register values of a subject processor. Subject code (17) is translated into target code (21) executable by a target processor (13). The generated target code (17) includes counterpart target instructions (214) associated with fault-vulnerable subject code instructions (174). Further, each of the counterpart target code instruction (214) is associated with recovery information (195). When an exception (e.g. a fault) occurs, the recovery information (195) is retrieved and used to recover a precise subject state, in particular by taking account of optimizations to generate the common-case target code (21). The precise subject state is then used to precisely handle the exception.

32 Claims, 11 Drawing Sheets

PRECISE HANDLING OF EXCEPTIONS DURING PROGRAM CODE CONVERSION

TECHNICAL FIELD

The present invention relates generally to the field of computers and computer software and, more particularly, to program code conversion methods and apparatus useful, for example, in code translators, emulators and accelerators which convert program code.

BACKGROUND OF THE INVENTION

In both embedded and non-embedded CPUs, there are predominant instruction Set Architectures (ISAs) for which large bodies of software exist that could be "accelerated" for performance, or "translated" to a myriad of capable processors that could present better cost/performance benefits, provided that they could transparently access the relevant software. One also finds dominant CPU architectures that are locked in time to their ISA, and cannot evolve in performance or market reach. Such CPUs would benefit from a software-oriented processor co-architecture.

Program code conversion methods and apparatus to facilitate such acceleration, translation and co-architecture capabilities are disclosed, for example, in published PCT application WO00/22521, and others.

A problem arises in that performing program code conversion inevitably brings overheads in the conversion process, compared with native execution of the subject program on a subject processor. A particular problem arises in relation to the handling of exceptions.

An exception is a condition that changes the normal flow of control in a program. An exception indicates that a condition has occurred somewhere within the system that requires the attention of the processor and usually needs to be handled before processing can continue. Exceptions can be subdivided into various different types such as interrupts, faults, traps or aborts. The terminology varies between different architectures, and particular types or categories of exceptions may be unique to particular architectures.

An exception may be generated ("raised") by hardware or by software. Hardware exceptions include such signals as resets, interrupts, or signals from a memory management unit. As examples, exceptions may be generated by an arithmetic logic unit or floating-point unit for numerical errors such as divide-by-zero, for overflow or underflow, or for instruction decoding errors such as privileged, reserved, trap or undefined instructions.

Software exceptions are varied respectively across various software programs and could be applied to any kind of error checking which alters the normal behaviour of the program. As an illustrative example, an instruction in the subject code causes an exception to be reported if the value of one register is greater than the value of a second register.

An exception handler is special code which is called upon when an exception occurs during the execution of a program. If the subject program does not provide a handler for a given exception, a default system exception handler will be called, usually resulting in abortion of the program being run and an error indication being returned.

Exception signals are a common mechanism for raising exceptions on many operating systems. The POSIX standard, which is adhered to by many operating systems, particularly Unix-like systems, specifies how this mechanism should behave so that exception signals are broadly similar across many systems. The most common events that trigger exceptions are when a process implemented by a program tries to (i) access an unmapped memory region or (ii) manipulate a memory region for which it does not have the correct permissions. Other common events that trigger exception signals are (iii) the receipt of a signal sent from another process, (iv) the execution by a process of an instruction that the process does not have the privilege level to execute, or (v) an I/O event in the hardware.

The present invention is particularly concerned with the precise handling of exceptions, also often referred to as precise exceptions. A precise exception is reported on a boundary between subject code instructions. When a precise exception is reported, the effects of all previous subject instructions are complete, the exception points to the first instruction of the subject code which has not been executed, and no effects from that subject instruction or any subsequent instruction have yet taken place.

In the context of binary translation, it is apparent that when a target instruction is performed on a target processor and causes an exception to be reported, the target instruction generally will not fulfil the conditions for reporting a precise exception to an exception handler written in subject code. Instructions are almost always performed on the target processor in a different order to the order of instructions in the corresponding block of subject code, firstly due to the differences between the instruction set of the subject processor for which the subject code was written and the target processor on which the target code is run, and secondly because of the optimisations that typically occur during program code conversion.

One known approach is the use of "recovery points", which return a virtual subject machine to the conditions that applied at entry into a section of code being translated or executed, i.e. by returning the virtual subject machine to the condition prevailing at the point of entry into the current block of subject code instructions being translated or executed.

U.S. Pat. No. 5,832,205 (Kelly et al) discloses an emulator which uses a set of "working" registers which are then copied to a set of "official" virtual subject registers at the end of each section of subject code, using a gated store buffer. If an exception occurs, this will affect only the working registers and the condition of the virtual subject machine can be recovered from the "official" registers at the point of entry into that section of subject code. However, the use of "working" and "official" registers adds significantly to the overhead of the emulation process in the target processor.

As another example, WO00/65440 discloses alternating between A and B register sets to provide historical recovery points during program code conversion.

Another approach is discussed in detail in co-pending published application GB2403563 and co-pending application U.S. Ser. No. 10/726,857. Here, a variable precision exception handling is applied, by recording different levels of detail for each of a plurality of types of instructions in the subject program. That is, the quantity and type of information to be recorded is varied according to the nature of the subject instruction. Suitably, each subject instruction is determined to be one of four types, and a corresponding level of detail is recorded. A first level records no state at all. A second level provides imprecise (inaccurate) state information using a last known stack frame. A third level records a precise subject program counter in a temporary abstract register during translation, which is then retrieved to handle an exception. A fourth level generates and plants additional target code to rectify a precise state (i.e. record the subject program counter and rectify any lazy or pending subject register values) immediately preceding an exception-raising target instruction (particularly a trap-type instruction which triggers an exception).

These prior art approaches rely on recording information which allows a subject processor state to be accurately determined at the point when an exception occurs, by rolling back to a previously defined recovery point or by rectifying subject state in advance of that point. However, in the prior art, obtaining a precise state for precise exception handling is still restrictive on the program code conversion process and involves considerable overhead and/or specific hardware support.

An aim of the present invention is to improve performance when undertaking program code conversion.

A preferred aim of the present invention is to reduce overhead associated with handling of exceptions during program code conversion, and most particularly during dynamic binary translation.

Another preferred aim of the embodiments of the present invention is to reduce overhead associated with providing a precise subject-state for precise handling of exceptions.

According to the present invention there is provided an apparatus and method as set forth in the appended claims. Preferred features of the invention will be apparent from the dependent claims, and the description which follows.

SUMMARY OF THE INVENTION

The following is a summary of various aspects and advantages realizable according to embodiments of the invention. It is provided as an introduction to assist those skilled in the art to more rapidly assimilate the detailed design discussion that ensues and does not and is not intended in any way to limit the scope of the claims that are appended hereto.

In particular, the inventors have developed methods directed at expediting program code conversion, particularly useful in connection with a run-time translator which provides dynamic binary translation of subject program code into target code.

In one aspect of the present invention there is provided a method of precisely handling exceptions in the context of program code conversion from subject code to target code. The method includes generating target code including one or more counterpart target instructions from a fault-vulnerable subject code instruction. Each of the counterpart target instructions is associated with recovery information. After an exception (e.g. a fault) occurs during execution of the target code instructions, the recovery information is retrieved and used to rectify a precise subject state.

Preferably, the recovery information takes account of optimisations performed during target code generation. Suitably, the recovery information is used to perform recovery routines which rectify a precise subject state representing a subject processor at the point of a fault-vulnerable subject code instruction.

Preferably, the method includes storing one or more recovery information items immediately following the generated target code. Retrieving the recovery information includes scanning down the target code to locate the recovery information subsequent thereto, and retrieving a recovery information item associated with a respective faulting counterpart target instruction.

Preferably, the target code and recovery information are interleaved in blocks.

In a particularly preferred embodiment, a target program counter is used to index the recovery information.

In a second aspect of the present invention there is provided a method of precisely handling exceptions with program code conversion from subject code to target code, including the steps of generating target code including at least one counterpart target instruction which corresponds to a potentially faulting subject instruction in subject code, and storing recovery information associated with the at least one counterpart target instruction. Upon receiving an interrupt signal, execution of the target code instruct is continues until one of the counterpart target instructions is encountered. Upon reaching the counterpart target instruction, the associated recovery information is retrieved and used to recover a precise subject state.

In a preferred embodiment, the precise exception handling method rolls forward from the point where an exception occurs, until a precise subject state is recoverable using the stored recovery information. Suitably, execution of the target code instructions continues one by one, preferably by invoking a target code interpreter or invoking a stepwise target processor mode.

The present invention also extends to a translator apparatus arranged to perform any of the methods defined herein. Also, the present invention extends to computer-readable storage medium having recorded thereon instructions implementable by a computer to perform any of the methods defined herein.

BRIEF DESCRIPTION OF THE DRAWINGS

The accompanying drawings, which are incorporated in and constitute a part of the specification, illustrate presently preferred implementations and are described as follows.

DETAILED DESCRIPTION

The following description is provided to enable a person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved program code conversion method and apparatus.

In the terminology below, a subject program is intended to execute on a subject computing platform including a subject processor. A target computing platform including a target processor is used to execute the subject program, through a translator which performs dynamic program code conversion. The translator performs code conversion from subject code to target code such that the target code is executable on the target computing platform.

Figure 1:
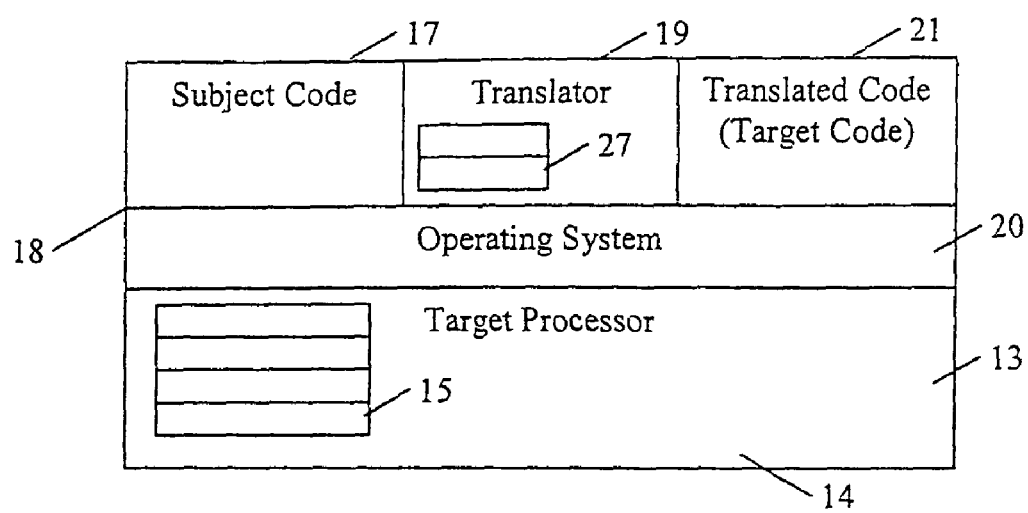
FIG. 1 is a block diagram illustrative of apparatus wherein embodiments of the invention find application.

FIG. 1 illustrates an example target computing platform comprising a target processor 13 having a plurality of target registers 15, and a memory 18 to store a plurality of software components 17, 19, 20, 21, and 27. The software components include an operating system 20, subject code 17, translator code 19, and translated target code 21.

In one embodiment, the translator code 19 is an emulator to translate subject code of a subject instruction set architecture (ISA) into translated target code of another ISA, with or without optimisations. In another embodiment, the translator 19 functions as an accelerator for translating subject code into target code, each of the same ISA, by performing program code optimisations.

The translator 19, i.e., the compiled version of source code implementing the translator, and the translated code 21, i.e., the translation of the subject code 17 produced by the translator 19, run in conjunction with the operating system 20 running on the target processor 13, which is typically a microprocessor or other suitable computer.

It will be appreciated that the structure illustrated in FIG. 1 is exemplary only and that, for example, software, methods and processes according to the invention may be implemented in code residing within or beneath an operating system. The subject code 17, translator code 19, operating system 20, and storage mechanisms of the memory 18 may bean of wide variety of types, as known to those skilled in the art.

In the apparatus according to FIG. 1, program code conversion is preferably performed dynamically, at run-time, while the target code 21 is running. The translator 19 runs inline with the translated program 21. The translator 19 is preferably employed as an application compiled for the target architecture. The subject program 17 is translated by the translator 19 at run-time to execute on the target architecture 14.

Running the subject program 17 through the translator 19 involves two different types of code that execute in an interleaved manner: the translator code 19; and the target code 21. The translator code 19 is generated such as by a compiler, prior to run-time, based on a high-level source code implementation of the translator 19. By contrast, the target code 21 is generated by the translator code 19, throughout run-time, based on the stored subject code 17 of the program being translated.

The subject program 17 is intended to run on a subject processor (not shown). In one embodiment, the translator 19 functions as an emulator. That is, the translator 19 emulates the subject processor, whilst actually executing the subject program 17 as target code 21 one target processor 13. In the preferred embodiment, at least one global register store 27 is provided (also referred to as the subject register bank 27 or abstract register bank 27). In a multiprocessor environment, optionally more than one abstract register bank 27 is provided according to the architecture of the subject, processor. A representation of a subject processor state is provided by components of the translator 19 and the target code 21. That is, the translator 19 stores the subject processor state in a variety of explicit programming language devices such as variables and/or objects. The compiler used to compile the translator 19 determines how the state and operations are implemented in target code. The target code 21, by comparison, provides subject processor state implicitly in the target registers 15 and in memory locations 18, which are manipulated by the target instructions of the target code 21. For example, the low-level representation of the global register store 7 is simply a region of allocated memory. In the source code of the translator 19, however, the global register store 27 is a data array or an object which can be accessed and manipulated at a higher level.

Figure 2:
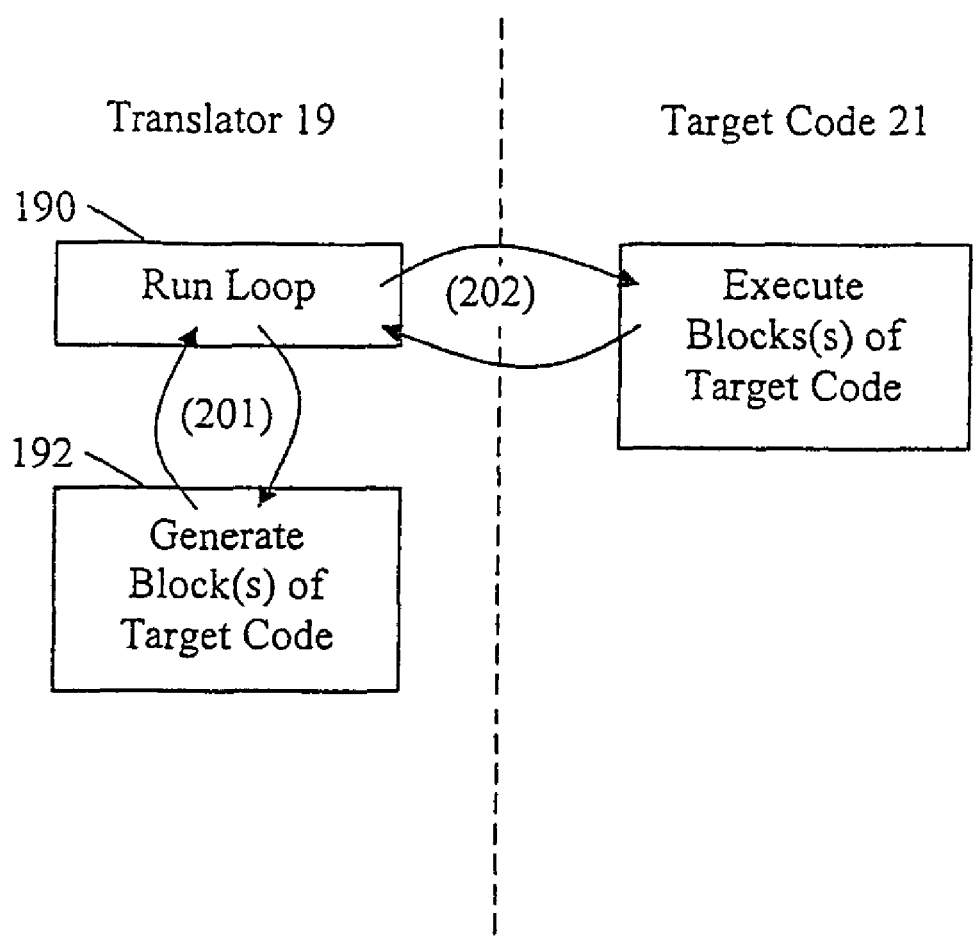
FIG. 2 is a schematic flow diagram illustrating a preferred method of execution control during program code conversion.

FIG. 2 is a schematic flow diagram illustrating a preferred method of execution control during program code conversion.

As shown in FIG. 2, control initially resides with a translator control loop 190. In step 201, the control loop 190 calls a code generation function 192 of the translator code 19, which translates a block of the subject code 17 into a corresponding block of translated code 21. Then, in step 202, that block of translated code 21 is executed on the target processor 13. Conveniently, the end of each block of translated code 21 contains instructions to return control back to the control loop 201. In other words, the steps of translating and executing the subject code are interlaced, such that portions of the subject program 17 are translated and then executed in turn.

Here, the term "basic block" will be familiar to those skilled in the art. A basic block is a section of code with exactly one entry point and exactly one exit point, which limits the block code to a single control path. For this reason, basic blocks are a useful fundamental unit of control flow. Suitably, the translator 19 divides the subject code 17 into a plurality of basic blocks, where each basic block is a sequential set of instructions between a first instruction at a single entry point and a last instruction at a single exit point (such as a jump, call or branch instruction). The translator may select just one of these basic blocks (block mode) or select a group of the basic blocks (group block mode). A group block suitably comprises two or more basic blocks which are to be treated together as a single unit. Further, the translator may form iso-blocks representing the same basic block of subject code but under different entry conditions.

In the preferred embodiments, trees of Intermediate Representation (IR) are generated based on a subject instruction sequence, as part of the process of generating the target code 21 from the original subject program 17. IR trees are abstract representations of the expressions calculated and operations performed by the subject program. Later, the target code 21 is generated based on the IR trees. Collections of IR nodes are actually directed acyclic graphs (DAGs), but are referred to colloquially as "trees".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of abstract register definitions which correspond to specific features of the subject architecture upon which the subject program 17 is intended to run. For example, there is a unique abstract register definition for each physical register on the subject architecture ("subject register"). As such, abstract register definitions in the translator may be implemented as a C++ object which contains a reference to an IR node object (i.e., an IR tree). The aggregate of all IR trees referred to by the set of abstract register definitions is referred to as the working IR forest ("forest" because it contains multiple abstract register roots, each of which refers to an IR tree). These IR trees and other processes suitably form part of the translator code generation function 192.

Exception Handling

Figure 3:
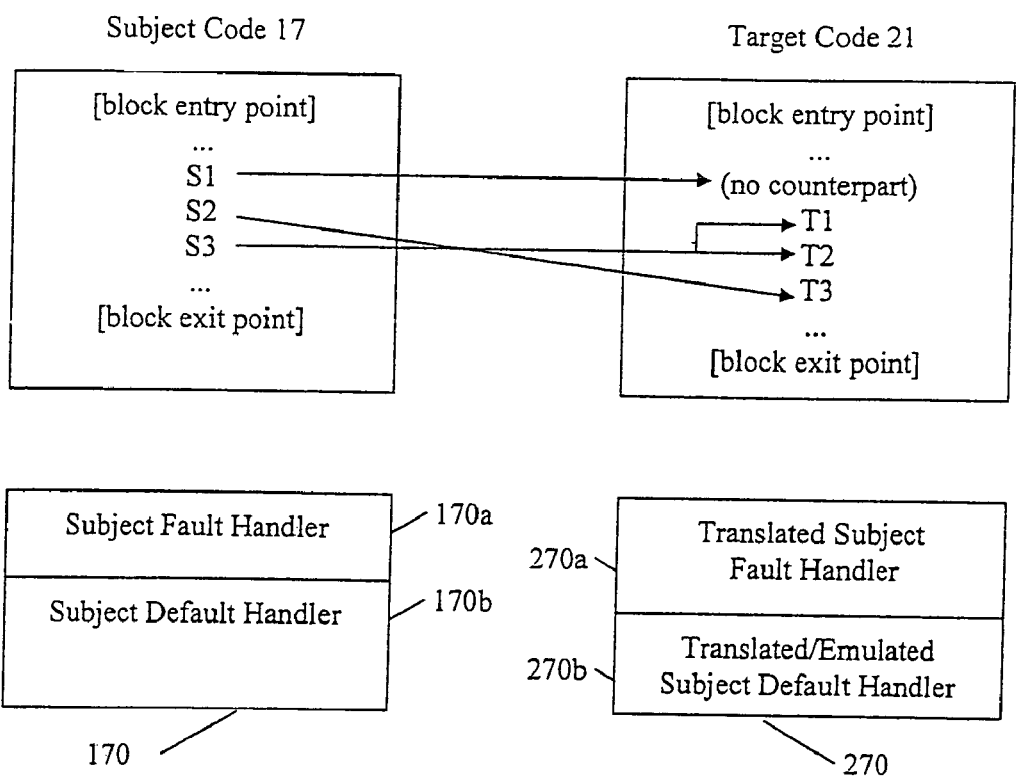
FIG. 3 is a schematic diagram to show a relationship between subject instruction and target instructions following program code conversion.

FIG. 3 is a schematic diagram to show a relationship between instructions in a subject program and instructions in a target program, following program code conversion in referred embodiments of the present invention.

In this example, subject instructions S1-S3 result in functionally equivalent target instructions T1-T3. The subject instruction S1 has been removed such as by a dead code elimination optimisation and has no counterpart in the generated target code. Subject instruction S2 results in one equivalent target instruction T3. By contrast, subject instruction 53 results in two target instructions T1 & T2. There may be a one to none, one to one, one to many or many to one relationship between the target and subject code instructions.

As also shown in FIG. 3, another commonly used optimisation is to perform code rescheduling, whereby an instruction sequence in the target code is not equivalent to the original sequence in the subject code. Here, the second subject instruction S2 has been rescheduled as the third target instruction T3.

FIG. 3 also shows a subject exception handler 170. Typically, the subject environment would provide one or more specific subject fault handlers 170a (i.e. specific to a particular type of exception) and/or one or more default exception handlers 170b (to be employed where no specific exception handler is registered).

In this example, any of the subject instructions S1, S2 or S3 potentially results in an exception, which needs to be handled by subject exception handler 170.

A translated subject exception handler 270 provides an exception handler in target code to execute on the target processor, which emulates the subject exception handler 170. In practice; one or more translated subject specific exception handlers 270a or default exception handlers 270b are provided. Once the exception has been handled, the exception handler 270 will usually return control to the target code 21.

The translated subject exception handler 270 expects to receive a precise subject state in order to precisely handle the exception. As noted above, recreating the precise subject state is both difficult and expensive. First, there is an actual cost associated with calculating and collecting the subject state. For example, translator optimizations such as lazy evaluation may postpone the calculation of subject register values by storing the underlying data necessary to calculate those values. Recreating the subject state in response to an exception requires those values to be rectified (i.e., calculated) immediately. Even if the subject registers have been calculated previously, they must be retrieved from memory, such as from the subject register bank 27.

Second, there is an opportunity cost associated with the capability of calculating a precise subject state at an arbitrary point in the subject program. Many key optimizations in a dynamic binary translator, such as code rescheduling, involve departures from a strict model of binary compatibility. Binary compatibility means that the translator can recreate the exact state of the subject architecture. A strict model is one in which the subject state can be recreated at any point in the translated program (i.e., at any subject instruction). In order to reserve the information necessary to recreate the subject state at any point in execution, the translator must typically forego significant optimizations. When those optimizations are in use, the translator has no way to recreate the subject context accurately. Thus, the real cost of precise exception handling is not just the work of generating the precise subject state. There are restrictions to the code conversion process in order to be able to generate the subject state at all.

Faults

It is helpful to illustrate the present invention by concentrating firstly on a particular category of exceptions commonly known as faults.

Faults are typically used for error handling. Many operations may, in exceptional circumstances, be unable to produce a correct result. For example, an integer add instruction may produce a result which is too large to be represented (assuming that the size of the result matches that of the inputs). Processor architecture designers decide how such a fault will be flagged, if at all. Three typical design options are: to silently ignore the overflow, to flag the error by modifying internal processor state (e.g. status flags) but continue execution with the following instruction, or to raise an overflow exception. A particular architecture may offer a mix of these options, by offering faulting and non-faulting versions of a particular instruction.

As other examples, some common classes of faults are: arithmetic exceptions, various forms of memory fault (invalid addresses, protection violations, and alignment checks), and malformed or illegal (at current privilege level) instruction faults.

Faults are typically synchronous, coerced exceptions, since they occur due to the execution or a given instruction, in the context of the operand data, and processor state (including memory allocation, etc). Faults occur within instructions, which is to say that the faulting instruction cannot be completed. Typically a subject processor will resolve the register state to that at the start of the faulting instruction, allowing a fault handler to attempt to resolve the error, and for execution to be resumed. In certain circumstances it may not be possible to resolve such a state, which in turn can cause the fault to be terminal.

An example of a recoverable fault (typically at OS or sub-OS level) is a page fault—when a memory access attempts to access a page in virtual memory that is not present, an exception is raised. If the page is mapped, the virtual memory system will allocate a physical page, prepare it according to the mapping (e.g. load data if a file has been mapped at the address), and then update the page table structures accordingly. The processor may then resume execution at the same instruction, which now should be able to complete correctly.

Some faults may be maskable from user-mode applications—for example, alignment-checks are commonly available as a maskable fault on architectures that support misaligned accesses; on those that do not the alignment fault is non-maskable.

Some instructions in a subject instruction set architecture are known to be vulnerable to producing faults, whilst other instructions are not. That is, most instruction sets include some fault-vulnerable instructions (also termed faulting instructions or potentially faulting instructions), together with some fault invulnerable instructions which do not fault.

Faults are problematic since they are synchronous and are usually recoverable. Further, fault-vulnerable instructions tend to be executed relatively frequently in any real-life subject program. Hence, an improvement in the handling of faults has an immediate benefit in program code conversion and particularly in dynamic binary translation.

Fault Handling

Figure 4:
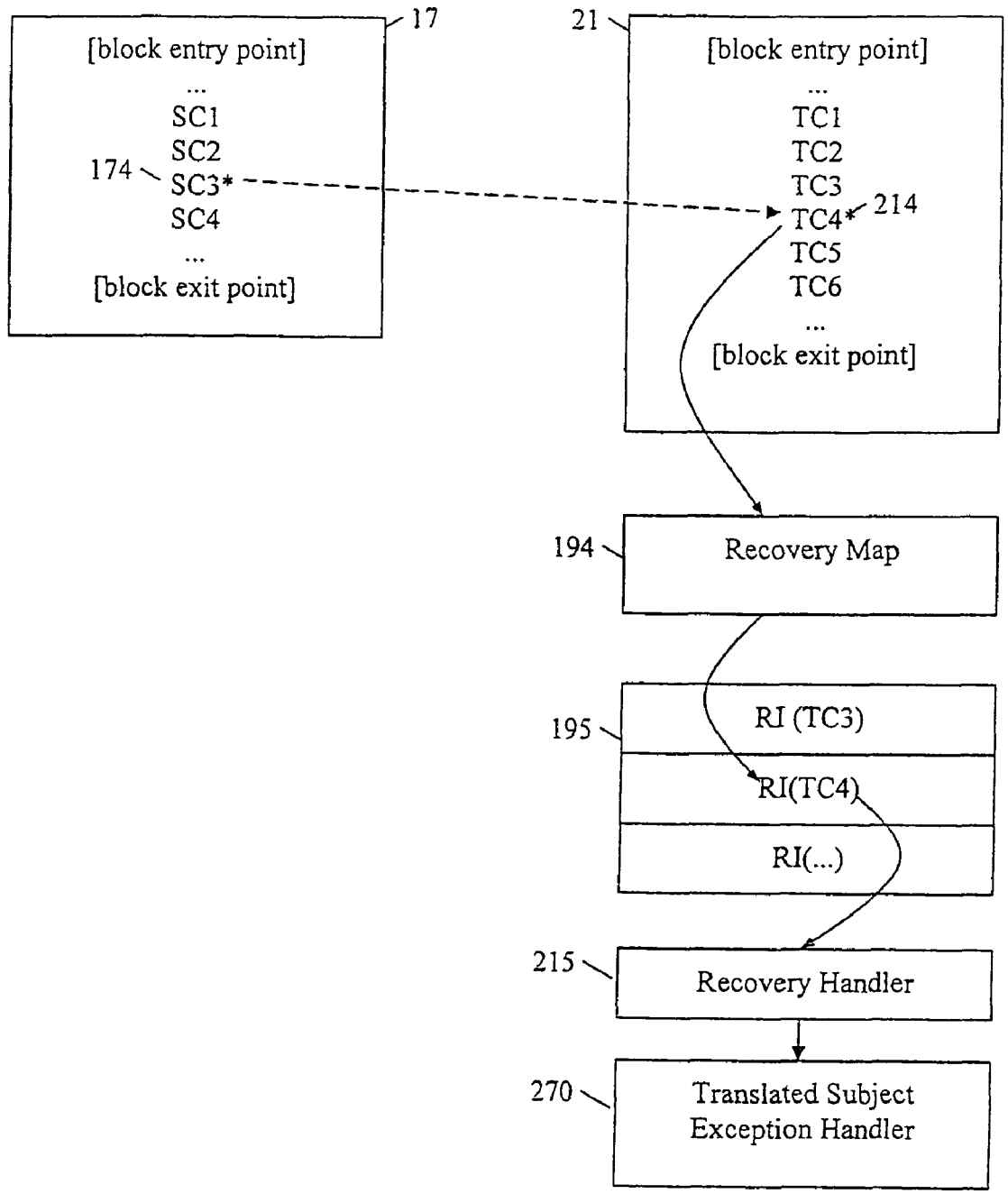
FIG. 4 shows an example program code structure in a target machine during program code conversion according to a preferred embodiment of the present invention.

FIG. 4 shows an example program code structure in a target machine during program code conversion according to a preferred embodiment of the present invention.

In FIG. 4; an example block of subject code 17 comprises subject instructions SC1 to SC4. One of these instructions (SC3*) is a fault-vulnerable instruction 174, whilst the remainder are fault-invulnerable.

Also, a corresponding block of target code 21 is shown with equivalent target code instructions TC1 to TC6. The fault-vulnerable subject instruction 174 (SC3) relates to one or more counterpart target instructions 214 in the generated target code 21 (in this case TC4*)

As shown in FIG. 4, a recovery map 194 is provided which links each of the counterpart target instructions 214 to a respective recovery information item 195. That is, each fault-vulnerable subject instruction 174 has one or more counterpart target code instructions 214, each of which is mapped to a respective target specific recovery information item 195.

The recovery information 195 allows precise handling of exceptions (especially faults) which occur during execution of the target code 21. In particular, the recovery information 195 allows additional native code instructions to be performed in order to create the precise subject state for precise handling of exceptions in the translated subject exception handler 270.

In one preferred embodiment, a recovery handler 215 is provided which uses the recovery information 195 to rectify the precise subject state, ready for the exception to be handled by the exception handler 270.

Figure 5:
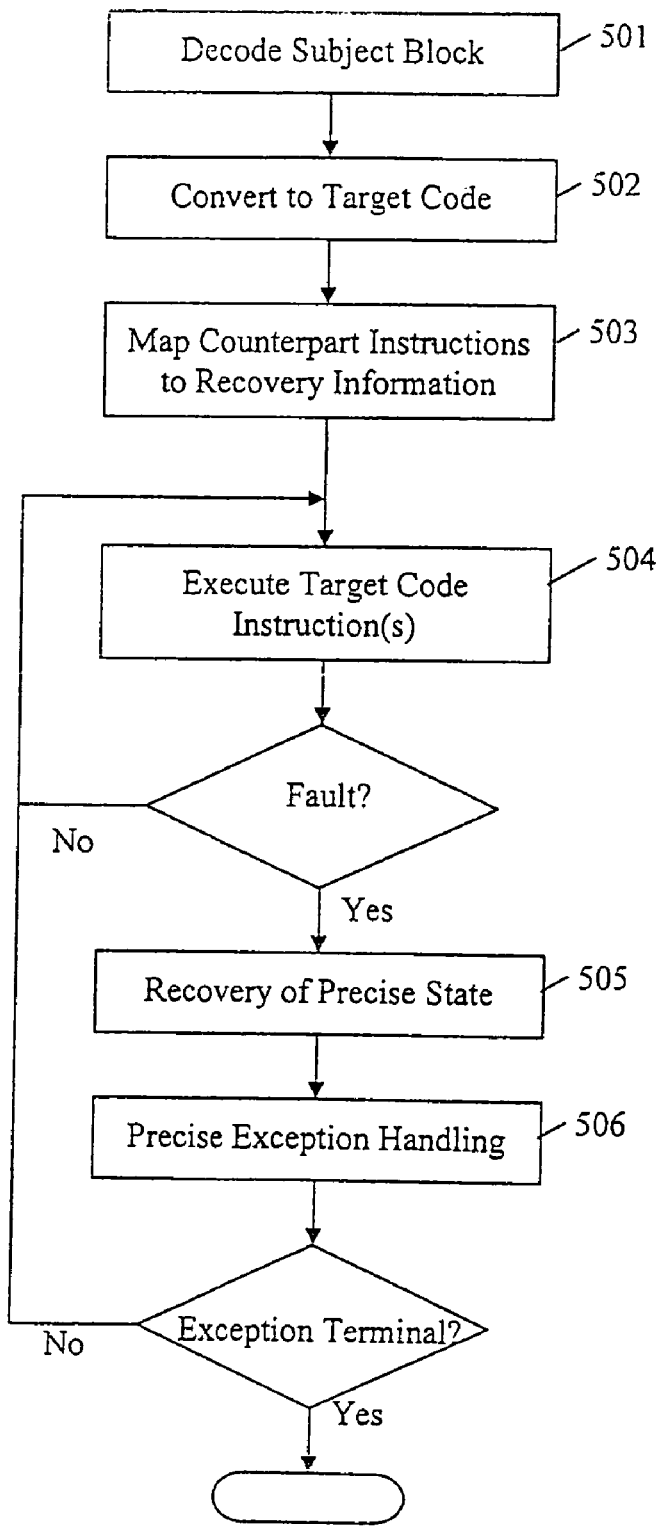
FIG. 5 is a schematic overview of a method to create target code for precise exceptions, according to a preferred embodiment of the present invention.

FIG. 5 is a schematic overview of a method to create the target code 21 capable of precise handling of fault-type exceptions, according to a preferred embodiment of the present invention.

In step 501, a section of subject code 17 is decoded, suitably a basic block. During decoding, one or more fault-vulnerable instructions 174 are identified according to the definitions of the subject TSA.

In step 502, program code conversion is performed to convert the subject code 17 into a corresponding bloc of target code 21. Optionally, the program code conversation includes optimisations such as dead code removal and/or code rescheduling, amongst others. The generated block of target code 21 includes one or more counterpart target instructions 214 for each of the fault-vulnerable subject instructions 174.

In step 503, recovery information 195 is provided for each of the counterpart target instructions 214. Suitably, entries are created in a recovery mapping table 194 linking each counterpart target instruction 214 to the respective recovery information 195.

In step 504, instructions in the generated block of target code 21 are executed. If no exceptions (faults) occur, then execution continues until the end of the block and then control flows to call the next block, such as through the translator run loop of FIG. 2.

In step 505, when an exception (a fault) occurs in relation to one of the counterpart target instructions 214, the respective recovery information 195 is obtained and used to rectify a precise subject state. That is, the recovery information 195 is employed to execute a set of additional recovery code instructions (ideally in the recovery handler 215).

The recovery handler 215 is suitably written in native code which is natively executable by the target processor (as opposed to being translated target code dynamically generated by the translator 19).

At step 506, the exception is precisely handled by the exception handler 270. That is, the recovery at step 505 provides a precise subject state to meet the conditions of precise exception handling by the exception handler 270. Usually, the exception is handled successfully and control returns to the executing program. Typically, control returns to complete execution of the current block. In other cases the fault is terminal and the program ends.

Storing Recovery Information

Figure 6:
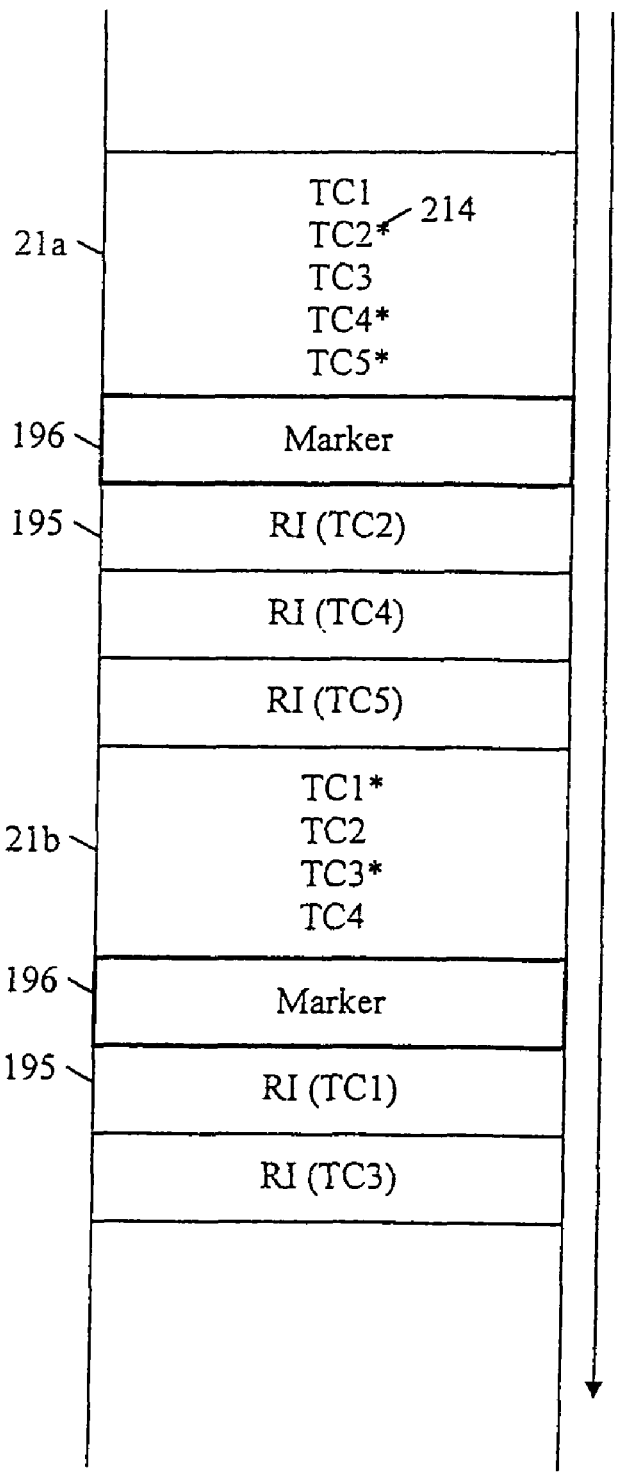
FIG. 6 is a schematic diagram showing a preferred mechanism to store recovery information and generated target code.

FIG. 6 shows a preferred mechanism to store recovery information 195 and generated target code 21 on the target computing platform.

The recovery mechanism discussed above itself brings some cost to the translator 19. Firstly, memory space is required to store the recovery information 195. Further, space is required to store the recovery map 194 which links each counterpart target code instruction 214 to the respective recovery information 195. When an exception (fault) occurs, it is desired to obtain the relevant recovery information 195 quickly and efficiently.

FIG. 6 shows an area of memory in the target computing platform which stores a generated block of target code 21a. The target code block 21a includes one or more counterpart target instructions 214 which correspond to fault vulnerable instructions 174 in the subject code.

The recovery information 195 is stored in memory immediately following the respective target code block 21a. That is, each of the counterpart target instructions 214 has a respective recovery information item 195, which is stored immediately after the relevant target code block 21a.

Preferably, a marker 196 is provided in order to readily distinguish between the end of the target code block 21a and the start of the recovery information 195.

Further, as shown in FIG. 6, another translated target code block 21b is stored in memory, again followed by the respective recovery information 195 and a marker 196. That is, the target code 21 and the recovery information 195 are interleaved in memory.

When an exception (a fault) occurs in a particular counterpart target instruction 214, the following steps are performed in order to obtain the respective recovery information.

The first step is to scan down to the end of the target code block. Conveniently, this step comprises reading successive Instructions until the marker 196 is identified. Secondly, scanning down the list of recovery information 195 identifies the respective desired recovery information.

In a particularly preferred embodiment, each recovery information 19 is indexed according to the program counter of a counterpart target instruction 214. That is, the program counter value of the counterpart target code instruction 214 forms an index in the list of recovery information 195. When an exception occurs, the target program counter is readily available in the target processor. Scanning the memory firstly for the marker 195 and then secondly for the target program counter in the list of recovery information efficiently locates the respective recovery information 115.

Figure 7:
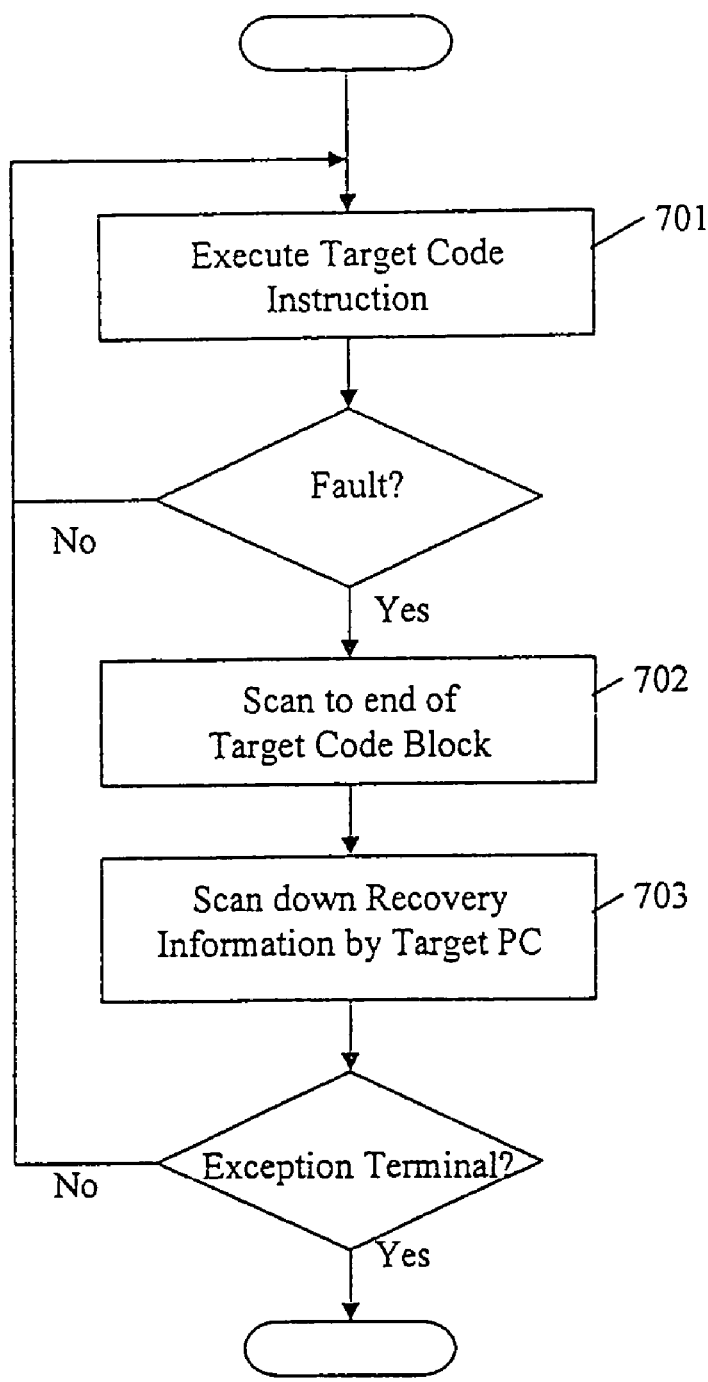
FIG. 7 is a schematic diagram of a preferred method of obtaining recovery information.

FIG. 7 shows a preferred method of obtaining recovery information using the memory layout of FIG. 6.

In practical embodiments, each basic block typically contains around twelve instructions. Hence, it is relatively fast to scan to the end of the current target code block since the distances involved are relatively short. In a preferred embodiment, each subject block is limited to a maximum size of say 100 or 200 instructions. Even in these rare cases of relatively long target blocks, scanning is still an effective and cheap mechanism.

Figure 8:
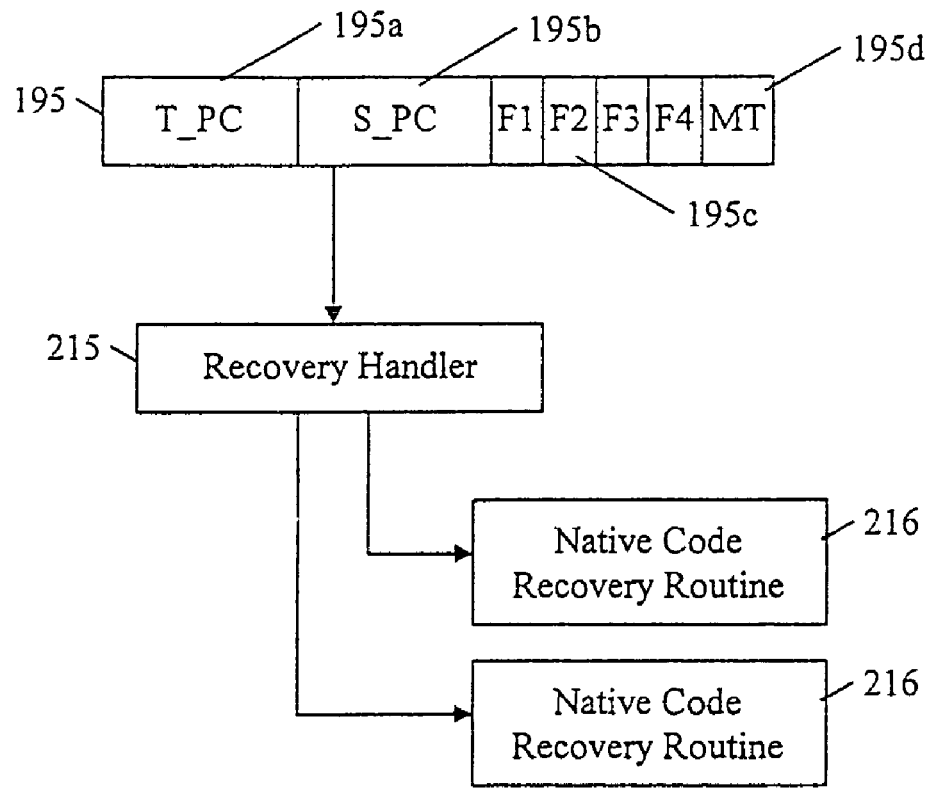
FIG. 8 is a schematic representation of recovery information used in a preferred embodiment of the present invention.

FIG. 8 shows a particularly preferred embodiment of the recovery information 195.

In the example of FIG. 8, the recovery information 195 includes a target program counter 195a, a subject program counter 195b, a set of recovery indicators 195c and a mapping template 195d.

The recovery information 195 allows the recovery handler 215 to rectify a precise subject state in particular, the precise subject state comprises a subject program counter value and subject register values.

Suitably, the recovery handler 215 uses the recovery information to rectify the subject program counter (if it is not already available). In this example, the recovery information 195 stores an accurate subject PC 195b for each target PC 195a. The subject PC is rectified by reading this field 195b in the stored recovery information.

The mapping template 195d identifies an appropriate register mapping applicable at the point of the counterpart target instruction 214. The recovery handler 215 rectifies the subject processor register values. In one embodiment, the register values are rectified to the abstract register bank 27 in memory. Alternatively, memory stores are left in the target registers here, the recovery handler 215 uses the stored mapping template 195d to set a register mapping whereby subject registers are mapped to physical target registers.

As shown in FIG. 8, the stored recovery information 195 preferably includes a set of recovery indicators (optimisation flags) 195c which denote optimizations which are outstanding at the point of a particular target code instruction. In this example there are four recovery indicators set as flags F1, F2, F3 and F4. Suitably, the recovery handler 215 calls one or more native code recovery routines 216 to perform, the outstanding optimizations, based upon the recovery indicators F1-F4.

In particular, the recovery handler performs lazy work which had been deferred at the point when the exception 30 occurred. For example, many processors provide a set of condition code flags. A preferred optimization is to delay rectification of the condition code flags by instead storing underlying information which allows the correct state of the condition code flag to be rectified then needed. The recovery routine 216 performs the lazy condition code flag evaluation from the stored underlying information.

Figure 9:
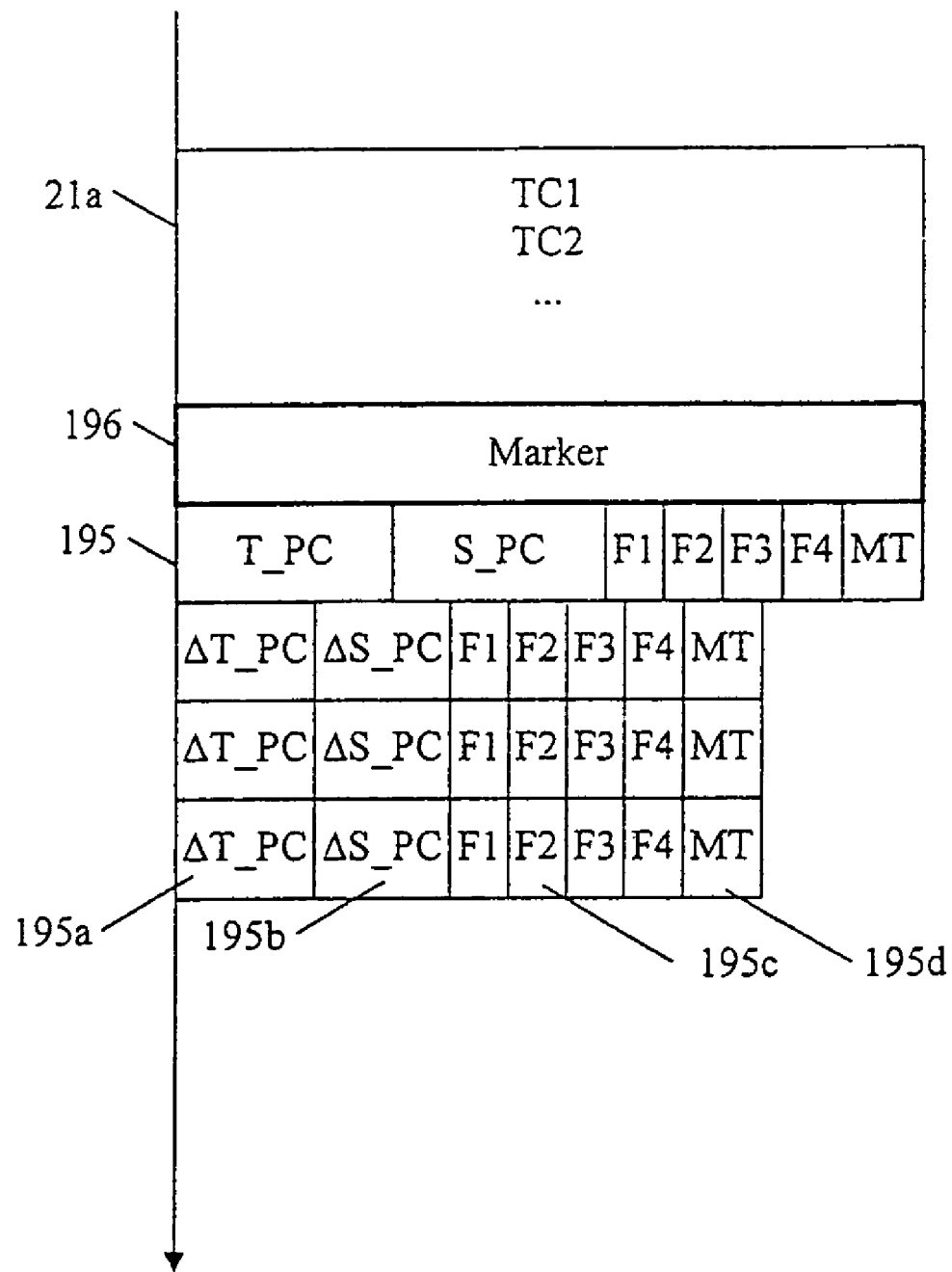
FIG. 9 is a schematic representation of recovery information used in another preferred embodiment of the present invention.

FIG. 9 shows another particularly preferred embodiment of the stored recovery information.

The recovery information 195 is ideally stored in a compressed form. Advantageously, a memory footprint of the recovery information is reduced. In some environments, the translator 19 operates on a computing platform along with many other processes, and it is desirable to reduce the amount of memory which is consumed by the overhead of the translator 19.

As shown in FIG. 9, a first Target PC 195a and a first subject PC 195b are stored as full values. Subsequent PCs are each stored as offsets from these base values. Suitably, the first recovery information 195 in each block of target code 21a, 21b is stored with full PC values as a base value, and each subsequent recovery information 195 stores a program counter value as an offset from the base value. Alternatively, a base PC is defined for the block, such as the PCs for first target code instruction in the block, whether or not this is a counterpart target instruction 214.

Example 1

PPC to x86 Translation

An example sequence of subject code 17 is shown below, as an illustrative example of the presently described techniques. The example subject code 17 is appropriate to a PowerPC (PPC) type processor:

Subject code (PPC):
0x0001003c: . . .
0x0.0010040: add. r3, r3, 68
0x00010044: 1d r3, 0(r3)
0x00010048: . . .

The example PPC subject code adds a constant value 68 to register "r3", and then loads from this address into r3. The addition is performed with a PPC dotted add instruction, which sets flags in field 0 of the PPC condition field register. Should the load fault then, for precise handling of the exception, the program counter value of the load instruction (0x00010044) should be reported, r3 should contain the value after the add operation has been performed, and the condition field 0 should have been updated.

After program code conversion, the example target code 21 below is produced. In this example the target code is executable by an x86 type processor:

Target code (x86):
0x40083200: mov 12(% ebp), % eax
0x40083203: add $68, % eax
0x40083206: mov (% eax), % ecx
0x40083208: mov % ecx, 12(% ebp)

The target code loads the value for subject register r3 (found at offset 12 from the ebp register, which here points to the abstract register bank 27), into register eax. The target code now adds 68 to eax, and then loads from this address into ecx. Finally this result is stored back to the subject register r3 in the abstract register bank.

In this example, an exemplary instance of the recovery information 195 is:

0x40083206:
subj_addr=0x00010044,
flags=cr0_lazy1_cmp0,
register_map=[lazy1(% eax), r3(% eax)].

The target PC (0x40083206) is used to index the recovery information, In this case, the target mov instruction is the counterpart target instruction to the potentially faulting subject load instruction. The accurate subject PC is recorded (0x00010044). A flag is used to show that condition register field 0 needs to be rectified based on a comparison to zero of the value in a special subject register, called lazy1. Also, recovery information indicates that the value for subject registers lazy1 and r3 are in the target register eax (the value produced by the add target instruction 0x40083203). In order to recover, the value from eax will be spilled to the appropriate subject registers, the condition field can now be rectified by performing the appropriate comparison using the value now spilled to lazy1, and the appropriate PC can be reported.

In summary, the recovery information allows work to be performed only when needed. That is, work is performed only in the exceptional case, when an exception occurs. Most of the time, in normal execution, a precise subject state is not required and is not rectified. The recovery mechanism discussed herein allows work to be deferred, or not performed at all, during normal execution of the generated target code. As a result, normal execution of the target code becomes faster and more efficient. However, when an exception occurs, the recovery information 195 still allows a precise subject state to be rectified, and for the exception to be handled precisely. The recovery work is performed after the excepting has occurred, in order to rectify the precise subject state.

Interrupts

A further preferred aspect of the present information will now be described in more detail, relating to the precise handling of interrupts.

Interrupts are typically used for hardware device support. When an event occurs in a hardware device external to the processor, a signal is sent to inform the processor of the event. An example is the availability of data from an I/O device. The external device interrupts the current flow of instructions through the processor, in order to invoke a routine to service the interrupt. The use of interrupts alleviates the need for the system to continually poll devices to see if they are in need of servicing. Another example is timer interrupts which follow user applications to be interrupted at predetermined intervals, with control typically transferred to the operating system. Regular interrupts are a convenient mechanism to enforce the sharing of processor resource in a multi-tasking system.

Interrupts are asynchronous exceptions, in that they are instigated in reaction to an event in an external device, rather than the execution of a particular instruction within the processor. As such, interrupts may occur at an arbitrary point in an instruction stream. An interrupt is unrelated to the current instruction stream being executed, and execution resumes once the exception has been serviced.

Figure 10:
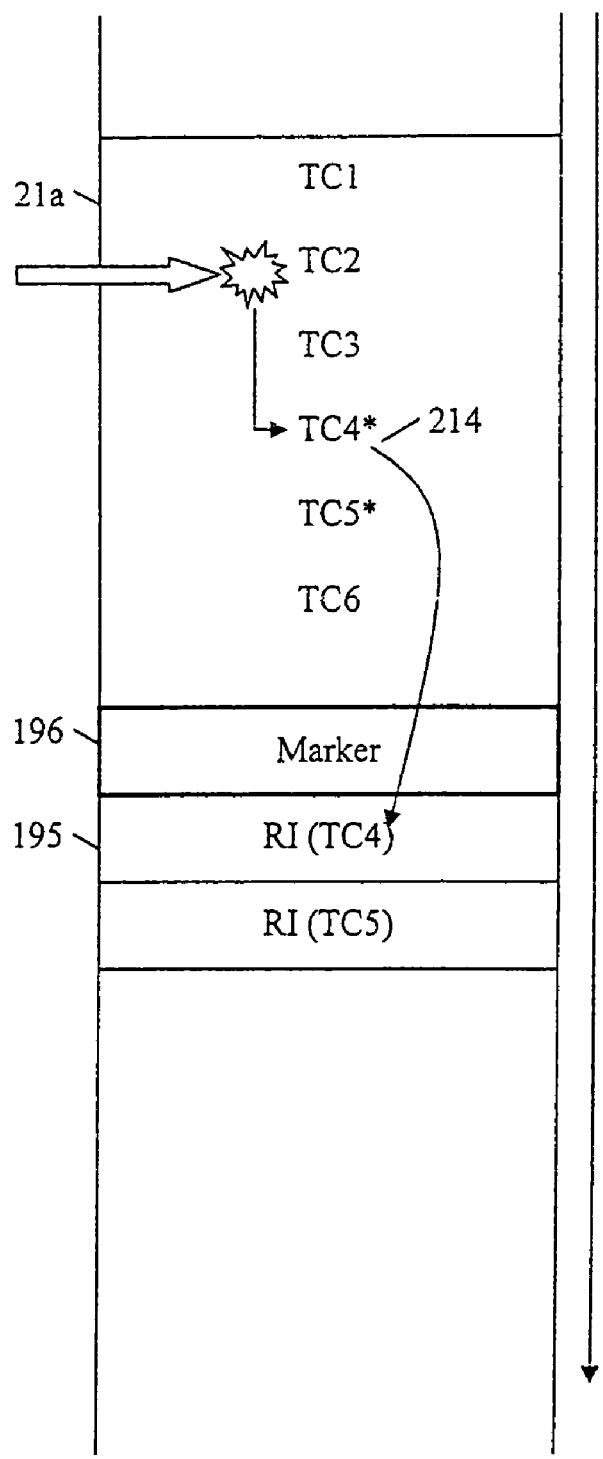
FIG. 10 shows an example target code sequence to illustrate handling of interrupts.

FIG. 10 shows an example target code sequence to illustrate handling of interrupts.

The block of target code 21a contains instructions TC1-TC6. In this example, an interrupt occurs while the processor is executing instruction TC2. Execution of the current instruction (TC2) is completed. Also, zero or more additional instructions are executed (TC3) until a counterpart target instruction 214 (in this case instruction TC4) is encountered which is associated with recovery information 195. That is, execution of the target code instructions rolls forward until the next point where a precise subject state is achievable.

When the processor reaches the next counterpart target instruction 214 with associated recovery information 195, the recovery information is passed to the recovery handler 215 in order to rectify a precise subject state. The precise subject state is then passed to an appropriate exception handler 270, which is suitably a subject interrupt handler.

Figure 11:
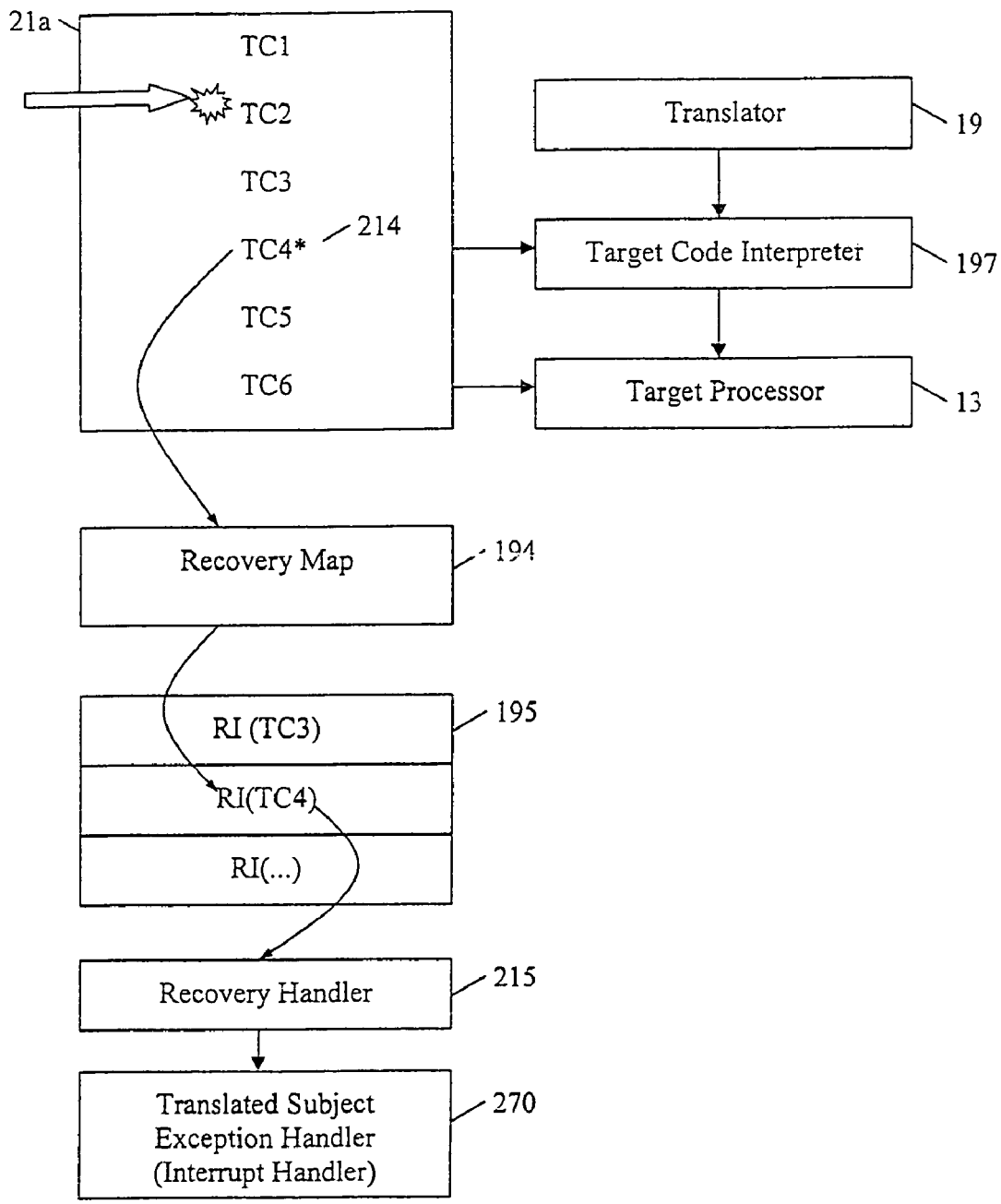
FIG. 11 is a schematic view showing a preferred implementation to handle interrupts within a target computing platform.

FIG. 11 shows three preferred implementations to handle interrupts within the target computing platform.

In a first preferred embodiment, a target code interpreter 197 is invoked when an interrupt-type exception occurs. The target code interpreter 197 executes the target code instructions one by one, until a counterpart instruction 214 having recovery information 195 is reached.

In a second embodiment, a step processor mode is invoked. That is, the target processor 13 is controlled to enter a stepped processor mode which executes the target code instructions one by one until a counterpart instruction 214 is reached.

In a third preferred embodiment, check criteria are invoked to execute the target code instruction by instruction until a counterpart instruction 214 with recovery information 195 is reached.

If no fault vulnerable counterpart target instructions 214 are encountered in the target code block 21a, execution suitably runs to the end of the block. In a preferred embodiment, a precise subject state is rectified at a block boundary.

Traps

Traps are typically explicitly and unconditionally user-requested exceptions. Where a subject instruction raises a trap-type exception, the translator 19 generates target code for that instruction which directly performs the behaviour required to handle the trap event.

Some instruction set architectures define traps that require further special handling, such as single-stepping traps and conditional traps (for example the INTO instruction in the IA-32 architecture). Conditional traps, where the common case is for the exception not to be raised, are preferably handled similar to faults as discussed above. This way, work in the common case is minimised. In the exceptional case, the required additional work is then invoked through the recovery handler.

Aborts

Aborts are typically non-recoverable events, but may have a variety of characteristics. Aborts are typically used to manage critical system failure. Upon detecting a hardware failure such as an inconsistency of an internal processor state, or a serious software failure such as a fault within critical regions of the operating system, then the processor may attempt to ignore the error and continue execution, halt or rebbot for safety, or an exception may be raised to signal the error to the operating system. Like faults, aborts occur within instructions. Aborts are often terminal. Aborts are usually not user maskable.

Should an abort, such as a machine check error, occur within execution of an instruction that is not expected to fault, it is difficult to fully reproduce a precise subject state at that aborting instruction. Generally, it is very expensive to handle aborts precisely in the context of dynamic binary translation.

As will be appreciated from the above discussion, the exception handling mechanisms discussed herein have many advantages. In particular, work is removed from the common case wherever possible, and is only performed in the exceptional case, which occurs infrequently during a typical execution of a program. However, a precise subject state is achieved when required. Also, overhead to achieve the precise subject state is minimised.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details or the foregoing embodiment (s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of handling precise exceptions with program code conversion from subject code to target code, comprising:
    decoding subject code executable by a subject processor according to a subject instruction set architecture, and identifying a fault-vulnerable instruction which is potentially faulting in the subject instruction set architecture;

generating target code from the subject code, including
generating one or more counterpart target instructions
from the identified fault-vulnerable subject instruction,
and storing recovery information associated with the
counterpart target instruction(s);

executing the target code on a target processor according to
a target instruction set architecture; and when executing a particular one of the counterpart target
instructions indicates a fault:
retrieving the recovery information associated with the
particular counterpart target instruction;
recovering a precise subject state which accurately represents the subject processor at the fault, using the
recovery information; and
precisely handling the fault using the precise subject
state.

2. The method of claim 1, wherein generating the target code includes performing one or more optimizations, and wherein the recovery information provides information concerning the one or more optimizations.

3. The method of claim 1, wherein generating the target codes includes performing one or more optimizations which leave an inaccurate subject state at the one or more counterpart target instructions, and the recovery information renders obtainable a precise subject state from the available inaccurate subject state.

4. The method of claim 1, wherein the precise subject state includes at least an accurate subject program counter.

5. The method of claim 1, wherein the precise subject state includes at least accurate register values representing subject registers of the subject processor.

6. The method of claim 1, wherein storing the recovery information comprises storing the recovery information immediately following the generated target code.

7. The method of claim 6, wherein retrieving recovery information comprises:
scanning down the target code to locate the recovery information subsequent thereto; and
retrieving the recovery information associated with the respective counterpart target instruction.

8. The method of claim 1, comprising:
dividing the subject code into a plurality of blocks;
generating a plurality of blocks of target code; and
storing recovery information interleaved between the generated blocks of target code.

9. The method of claim 1, comprising storing a marker separating the target code from the recovery information, and retrieving the recovery information by scanning from the counterpart target instruction indicating a fault to locate the marker and then scanning from the marker to locate the associated recovery information.

10. The method of claim 1, comprising storing the recovery information indexed by a target program counter denoting the associated counterpart target instruction.

11. The method of claim 1, wherein recovering the precise subject state includes passing the retrieved recovery information to a recovery handler, obtaining a currently available subject state, and modifying the currently available subject state using the recovery information to provide the precise subject state.

12. The method of claim 1, comprising passing the recovery information to a recovery handler, and calling from the recovery handler to one or more native code recovery routines according to the recovery information.

13. The method of claim 1, wherein the recovery information comprises a target program counter value and a subject program counter value.

14. The method of claim 13, wherein the recovery information further comprises a set of recovery indicators which denote optimizations which are outstanding at the point of the counterpart target code instruction.

15. The method of claim 13, wherein the recovery information further comprises a mapping template which identifies a mapping of target registers to abstract subject registers applicable at the point of the counterpart target instruction.

16. The method of claim 1, wherein the recovery information is stored in a compressed form.

17. The method of claim 13, wherein the recovery information comprises a first recovery information item with respect to a block of target code stored with a full program counter value as a base value, and one or more subsequent recovery information items each comprising a program counter value as an offset from the base value.

18. The method of claim 1, further comprising:
upon receiving an interrupt signal at the target processor during execution of the target code, continuing execution of the target code until encountering one of the counterpart target instructions(s);
retrieving the recovery information associated with the respective counterpart instruction and recovering the precise subject state;
precisely handling the interrupt using the precise subject state.

19. A method of precisely handling exceptions with program code conversion from subject code to target code, the method comprising:
translating the subject code executable by a subject processor into target code executable by a target processor, comprising:
identifying a fault-vulnerable instruction in the subject code;
generating one or more counterpart target code instructions as counterparts to the fault-vulnerable subject instruction; and
storing a recovery information associated with the or each counterpart target instruction; and
executing the target code on the target processor, comprising:
when an exception occurs in relation to a particular one of the counterpart target instructions, locating the recovery information associated with the particular counterpart target instruction;
executing a recovery routine to rectify a precise subject state representing the subject processor, according to the located recovery information; and
invoking an exception handler to handle the exception with respect to the rectified precise subject state.

20. A method of precise handling of exceptions with program code conversion from subject code to target code, comprising:
generating target code including at least one counterpart target instruction which corresponds to a potentially faulting subject instruction in the subject code, and storing recovery information associated with the at least one counterpart target instruction;
upon receiving an interrupt, continuing execution of target code instructions until encountering the at least one counterpart target instruction;
upon reaching the counterpart target instruction, recovering a precise subject state using the associated recovery information; and
precisely handling the interrupt using the recovered precise subject state.

21. The method of claim 20, comprising, upon receiving the interrupt, executing the target code instructions one by one.

22. The method of claim 21, comprising invoking a stepwise mode in the target processor to execute the target instructions one by one.

23. The method of claim 21, comprising invoking a target code interpreter to interpret the target code instructions one by one.

24. A method of precisely handling exceptions with dynamic binary translation from subject code to target code, comprising:
   generating a sequence of target code instructions from a sequence of subject code instructions;
   executing the sequence of target code instructions and, when an exception occurs, rolling forwards along the sequence of target code instructions until encountering a target code instruction where a precise subject state is achievable; and
   deferring handling of the exception until the precise subject state is achievable.

25. A translator apparatus arranged to perform program code conversion from subject code to target code, comprising:
   a translator unit having a decoding unit to decode subject code which is executable by a subject processor according to a subject instruction set architecture, and identify a fault-vulnerable instruction which is potentially faulting in the subject instruction set architecture, and a target code generating unit to generate target code from the subject code, including generating one or more counterpart target instructions from the identified fault-vulnerable subject instruction, and storing recovery information associated with each of the counterpart target instructions;
   a target processor to execute the target code according to a target instruction set architecture;
   a recovery handler unit to retrieve the recovery information associated with a respective one of the one or more counterpart target instructions and recover a precise subject state using the recovery information, when executing the respective one of the counterpart target instructions in the target processor indicates a fault; and
   an exception handling unit to precisely handle the fault using the precise subject state.

26. A translator apparatus arranged to perform program code conversion from subject code to target code, comprising:
   a translator unit to translate the subject code executable by a subject processor into target code executable by a target processor, where the translator unit identifies a fault vulnerable instruction in the subject code, generates one or more counterpart target code instructions as counterparts to the fault-vulnerable subject instruction, and stores a recovery information associated with each of the one or more counterpart target instructions; and
   a target processor to execute the target code such that, when an exception occurs in relation to a respective one of the one or more counterpart target instructions, the recovery information is located associated with the respective counterpart target instruction, a recovery routine is executed to rectify a precise subject state representing the subject processor according to the located recovery information, and an exception handler is invoked to handle the exception with respect to the rectified precise subject state.

27. A translator apparatus arranged to perform program code conversion from subject code to target code, comprising:
   a translator unit to generate target code including at least one counterpart target instruction which corresponds to a potentially faulting subject instruction in the subject code, and to store recovery information associated with the at least one counterpart target instruction;
   a target processor to execute the target code such that, upon receiving an interrupt, execution of target code instructions continues until the at least one counterpart target instruction is encountered;
   a recovery handler to recover a precise subject state using the associated recovery information, when the at least one counterpart target instruction is encountered by the target processor; and
   a translated subject exception handler to handle the interrupt using the recovered precise subject state.

28. A translator apparatus arranged to perform program code conversion from subject code to target code, comprising:
   a translator unit to generate a sequence of target code instructions from a sequence of subject code instructions;
   a target processor to execute the sequence of target code instructions and, when an exception occurs, roll forwards along the sequence of target code instructions until encountering a target code instruction where a precise subject state is achievable; and
   an exception handler to handle the exception when the precise subject state is achievable.

29. A computer-readable medium having recorded thereon instructions implementable by a computer to perform a method of handling precise exceptions under program code conversion from subject code to target code, comprising:
   decoding subject code executable by a subject processor according to a subject instruction set architecture, and identifying a fault-vulnerable instruction which is potentially faulting in the subject instruction set architecture;
   generating target code from the subject code, including generating one or more counterpart target instructions from the identified fault-vulnerable subject instruction, and storing recovery information associated with the or each of the counterpart target instructions;
   executing the target code on a target processor according to a target instruction set architecture; and
   when executing the or one of the counterpart target instructions indicates a fault, then performing the steps of:
      retrieving the recovery information associated with the counterpart target instruction;
      recovering a precise subject state which accurately represents the subject processor at the fault, using the recovery information; and
      precisely handling the fault using the precise subject state.

30. A computer-readable medium having recorded thereon instructions implementable by a computer to perform a method of precisely handling exceptions under program code conversion from subject code to target code, the method comprising:
   translating the subject code executable by a subject processor into target code executable by a target processor, comprising:
      identifying a fault-vulnerable instruction in the subject code;

generating one or more counterpart target code instructions as counterparts to the fault-vulnerable subject instruction;

storing a recovery information associated with each of the counterpart target instructions(s); and executing the target code on the target processor, comprising:

when an exception occurs in relation to a particular one of the counterpart target instructions, locating the recovery information associated with the particular counterpart target instruction;

executing a recovery routine to rectify a precise subject state representing the subject processor, according to the located recovery information; and invoking an exception handler to handle the exception with respect to the rectified precise subject state.

31. A computer-readable medium having recorded thereon instructions implementable by a computer to perform a method of precise handling of exceptions under program code conversion from subject code to target code, comprising:

generating target code including at least one counterpart target instruction which corresponds to a potentially faulting subject instruction in the subject code, and storing recovery information associated with the at least one counterpart target instruction;

upon receiving an interrupt, continuing execution of target code instructions until encountering the at least one counterpart target instruction;

upon reaching the counterpart target instruction, recovering a precise subject state using the associated recovery information; and precisely handling the interrupt using the recovered precise subject state.

32. A computer-readable medium having recorded thereon instructions implementable by a computer to perform a method of precisely handling exceptions under dynamic binary translation from subject code to target code, comprising:

generating a sequence of target code instructions and, when an exception occurs, rolling forwards along the sequence of target code instructions until encountering a target code instruction where a precise subject state is achievable; and deferring handling of the exception until the precise subject state is achievable.

* * * * *